US010245938B2

(12) United States Patent
Bui et al.

(10) Patent No.: US 10,245,938 B2
(45) Date of Patent: Apr. 2, 2019

(54) ASSEMBLY OF AN AIR GUIDE TO A STRUCTURAL ELEMENT OF A MOTOR VEHICLE, AND CORRESPONDING VEHICLE

(71) Applicant: RENAULT s.a.s., Boulogne Billancourt (FR)

(72) Inventors: Joseph Bui, Les Mureaux (FR); Benoit Janier, Chaville (FR); Gilles Dauboin, Nandy (FR); Stephane Grevet, Pontcarre (FR)

(73) Assignee: RENAULT s.a.s., Boulogne Billancourt (FR)

( * ) Notice: Subject to any disclaimer, the term of this patent is extended or adjusted under 35 U.S.C. 154(b) by 0 days.

(21) Appl. No.: 15/912,146

(22) Filed: Mar. 5, 2018

(65) Prior Publication Data
US 2019/0047403 A1 Feb. 14, 2019

Related U.S. Application Data

(63) Continuation of application No. 15/645,732, filed on Jul. 10, 2017, now abandoned, which is a
(Continued)

(30) Foreign Application Priority Data

Mar. 17, 2014 (FR) .................................. 14 52185

(51) Int. Cl.
*B60K 11/08* (2006.01)
*B60K 11/04* (2006.01)

(52) U.S. Cl.
CPC .............. *B60K 11/08* (2013.01); *B60K 11/04* (2013.01); *B60Y 2306/01* (2013.01)

(58) Field of Classification Search
CPC ...... B60K 11/04; B60K 11/08; B60Y 2306/01
(Continued)

(56) References Cited

U.S. PATENT DOCUMENTS

| 4,944,540 | A | 7/1990 | Mansoor et al. |
| 6,422,643 | B1 * | 7/2002 | Pease ...................... B60R 19/52 24/297 |

(Continued)

FOREIGN PATENT DOCUMENTS

| DE | 10 2007 024 898 A1 | 2/2008 |
| DE | 10 2012 102 933 A1 | 10/2013 |

(Continued)

OTHER PUBLICATIONS

French Search Report dated Nov. 7, 2014 in FR 1452185 Filed Mar. 17, 2014.
(Continued)

*Primary Examiner* — John D Walters
(74) *Attorney, Agent, or Firm* — Oblon, McClelland, Maier & Neustadt, L.L.P.

(57) ABSTRACT

An air guide is assembled on a structural component of a motor vehicle by at least two fasteners that each include a first component and a second component. The fasteners project laterally from a frame defined by lateral edges of the structural component in a direction substantially perpendicular to the fastening direction. The first component is joined to the air guide by a retainer that breaks following an impact directed substantially parallel to the fastening direction. Lateral edges of the air guide exhibit guide parts situated substantially opposite second components. Each guide part guides a lateral edge of the structural component supporting a second component inside the air guide following a breakage of the retainer of the first component working together with the second component, the breakage resulting
(Continued)

in movement of the air guide towards the structural component in a direction substantially parallel to the fastening direction.

10 Claims, 5 Drawing Sheets

Related U.S. Application Data continuation of application No. 15/126,942, filed as application No. PCT/FR2015/050619 on Mar. 12, 2015, now abandoned.

(58) Field of Classification Search
USPC ............................... 180/68.1, 68.2, 281, 286
See application file for complete search history.

(56) References Cited

U.S. PATENT DOCUMENTS

2010/0314426 A1* 12/2010 Yokoi .................... B60K 11/04
224/555
2015/0068825 A1    3/2015 Berthevas et al.

FOREIGN PATENT DOCUMENTS

FR          2 948 903 A1    2/2011
FR          2 981 887 A1    5/2013

OTHER PUBLICATIONS

International Search Report dated Jun. 11, 2015 in PCT/FR2015/050619 Filed Mar. 12, 2015.

* cited by examiner

ASSEMBLY OF AN AIR GUIDE TO A STRUCTURAL ELEMENT OF A MOTOR VEHICLE, AND CORRESPONDING VEHICLE

CROSS-REFERENCE OF RELATED APPLICATION

The present application is a continuation of U.S. patent application Ser. No. 15/645,732, filed Jul. 10, 2017, which is continuation of U.S. patent application Ser. No. 15/126,942, filed Sep. 16, 2016, which is a continuation of International Application No. PCT/FR15/50619, filed Mar. 12, 2015, and claims priority to French Patent Application No. 14-52185, filed Mar. 17, 2014, the entire contents of which are incorporated herein by reference.

BACKGROUND

The invention relates to an assembly of an air guide on a structural component of a motor vehicle, and a corresponding vehicle.

The function of an air guide of this kind is to channel the air entering through at least one ventilation opening or grille in the front end or front apron skin of the vehicle, in order to guide it to a set of components combined in what is referred to as a "cooling case". This term is used to denote the set of components required for engine cooling which are sometimes stacked in layers or partially superposed. The cooling case is traditionally made up of the engine cooling water radiator, possibly of the air/air exchanger (charge air cooler [Refroidisseur Air Suralimentation—RAS]) and of the condenser.

The term of art "functional front end" (face avant technique, FAT) denotes a structure located in front of the engine block, the function of which is to support different elements, principally the radiator of the engine block. The functional front end may take on multiple forms. In certain cases, it is limited to a single cross-member. In other cases, it constitutes a chassis of more or less complex design, incorporating the cooling case. The functional front end incorporates different functions, such as the hood stop support, hood lock support or a leg supporting the hood lock, etc.

The air guide is usually fastened by fastening means onto a structural component of the functional front end. These fastening means comprise a receiving part extending in the transverse direction of the vehicle and integral with the functional front end, and a clipping finger received in a hole in the receiving part extending in the longitudinal direction of the vehicle and integral with the air guide. To the extent that the receiving part extends transversely to the vehicle, in the event of a small frontal impact and breakage of the clipping finger, the air guide comes to stop against this receiving part and therefore rests on the functional front end and the units that it supports, particularly the radiator. Hence, when the air guide moves back towards the rear of the vehicle following a frontal impact, this support is liable to damage the unit or units supported by the functional front end, even during a small frontal impact. It may then prove necessary to replace these units, which increases the repair costs. The air guide frequently comprises deformable parts which allow part of the impact to be absorbed and damage to the units supported by the functional front end to be limited. However, on account of their fastening function, the zones of the fastening means of the air guide to the functional front end cannot be deformable and thereby form hard points favoring support of the air guide on the functional front end.

There is therefore a need for fastening means of an air guide to a fixed component of the vehicle which allow damage to the parts supported by said fixed component to be limited in the event of an impact against the front end of the vehicle.

BRIEF SUMMARY

To this end, the object of the invention relates to an air guide assembly on a structural component of a motor vehicle comprising at least two fastening means of the air guide to the structural component, said fastening means being disposed on lateral edges of said air guide and of the structural component, each fastening means comprising a first fastening component integral with the air guide and a second fastening component integral with the structural component, the first and second fastening components being formed to work together in a same fastening direction, characterized in that:

the fastening means project laterally from a frame defined by the lateral edges of the structural component in a direction substantially perpendicular to the fastening direction, the first fastening component is joined to the air guide by retaining means formed to break following an impact in a direction substantially parallel to the fastening direction, the lateral edges of the air guide exhibit guide parts situated substantially opposite second fastening components, each guide part being formed to guide a lateral edge of the structural component supporting a second fastening component inside the air guide following a breakage of the retaining means of the first fastening component working together with said second fastening component, this breakage resulting in a movement of the air guide towards the structural component in a direction substantially parallel to the fastening direction.

An arrangement of this kind allows the air guide to move in respect of the structural component and thereby prevents the air guide from coming into abutment with the structural component, particularly with a fastening component thereof, during a small frontal impact, thereby reducing the risk of damage to units supported by this structural component.

The breakage of the retaining means may be achieved by producing fusible and/or divisible links such as, for example, film hinges or pre-slit hinges, zones of limited thickness, slots, notches, . . . . The guide parts may, in particular, be formed to guide a second fastening component inside the air guide.

The guide parts may form or be part of lateral walls of the air guide. The free edges of these lateral walls of the air guide form lateral edges of the air guide.

Advantageously, and in a non-limiting manner, this avoidance of the structural component can be achieved by means of a free edge of a guide part directed towards the structural component, said free edge not being opposite this structural component in the fastening direction. In other words, the free edge of the air guide, which may form part of a lateral edge of the air guide, is not opposite a lateral edge of the structural component.

Advantageously, and in a non-limiting manner, a guide part may define a concavity open towards the inside of the air guide and towards the structural component, said concavity exhibiting a splayed shape from the air guide towards the structural component in a direction substantially parallel to the fastening direction. The lateral edge of the structural component is then guided by the surfaces of this concavity during a movement of the air guide towards the structural component. The splayed shape allows the "entry" of the lateral edge of the structural component, particularly of a second fastening component, inside the concavity during this movement. The concavity may comprise one or a plurality of planar surfaces, for example three planar surfaces.

In particular, a guide part may define a splayed concavity on only part of its inner surface. For example, the guide part may exhibit at least one sloping section, for example a single sloping section, splayed towards the structural component in a direction substantially parallel to the fastening direction. This sloping section may, in particular, be planar surface. The free end of this sloping section may possibly slope more towards the outside of the air guide, such that the end of the concavity is more splayed. The surface may be sloping in respect of a lateral wall of the air guide, of which the guide part forms part.

In general terms, the dimensions of the splayed-shaped concavity may be chosen depending on the dimensions of the second fastening component, in such a manner that this second fastening component can be guided inside the concavity.

Advantageously, and in a non-limiting manner, the retaining means may link a first fastening component to a guide part. This may allow the guiding of the second component inside the guide part, the latter guide part then being very close to the second guide component.

Advantageously, the first fastening component may be situated at least partially inside the guide part, which may further facilitate the guiding of the second component inside this.

For example, the retaining means may link a first fastening component to a free edge of the guide part, which may allow the retaining means to be realized.

In particular, the free edge of this guide part may be a free edge of the flare-shaped concavity defined above, in particular the free edge of a sloping section. It may then be possible to regulate the breaking force of the retaining means, depending on the slope of the splayed shape.

Finally, the first fastening component may, moreover, be formed to close, at least partially, the opening of this concavity facing the structural component when it is integral with the guide part.

Advantageously, and in a non-limiting manner, the retaining means may comprise a hinge linking the first fastening component to a free edge of said guide part.

This hinge may, in particular, be a film hinge, a thin hinge, pre-slit, with or without notches. In other words, the retaining means may be realized in one piece with the air guide and the first fastening component, the latter being made of a polymer material. A hinge of this kind then allows the air guide to be produced by casting, the first fastening component being cast in what is referred to as a casting position, allowing casting, and then being pivoted into a usage position. The casting position is situated at 90° to the usage position, for example.

Advantageously, and in a non-limiting manner, the retaining means may comprise at least one retaining component formed to hold the first fastening component, particularly in a usage position in which it can cooperate with the second fastening component. According to the position of the first fastening component, the retaining component or components may be internal or external to the air guide, particularly to the guide part.

This retaining component may be chosen from among:
  a stop formed by a boss on the guide part,
  a mounted stop fastened to the guide part,
  a fastening lug integral with the guide part and the first fastening component,
  a fastening lug integral with the first fastening component, one end of which is inserted in, or is in contact with, a hole in the guide part.

These different stops and fastening lugs may, in particular, be formed:
  in order to prevent the first fastening component from moving towards the inside of the air guide in a direction substantially parallel to the fastening direction,
  in order to allow a movement of this kind when a breakage is sought, for example in the event of a frontal impact of predetermined force.

To this end, the number, position, dimensions of these stops and/or the fastening method of a mounted stop may, for example, be chosen as a consequence. A stop may project, for example, particularly inside the guide part, in a direction substantially perpendicular to the fastening direction. The number of stops may be two or more, without, however, being limited to this.

Similarly, the number, position, dimensions and shape of a fastening lug may be determined depending on the desired breakage point. The number of fastening lugs may be two or more, without, however, being limited to this.

For example, a fastening lug integral with the guide part and the first fastening component may link adjacent external faces of the guide part and of the first fastening component.

According to another example, fastening lug integral with the first fastening component, one end of which is inserted in, or in contact with, a hole in the guide part, may extend substantially parallel to the fastening direction, for example inside the air guide, particularly inside the guide part. The hole may be a through-hole. The end inserted in the hole or in contact therewith may be formed in such a manner as to allow the fastening lug to be removed outside the hole. Hence, this end may exhibit a rounded shape.

When the retaining component is a fastening lug integral with the first fastening component, one end of which is inserted in, or is in contact with, a hole in the guide part, the guide part may comprise sloping surfaces formed to move said fastening lug away from the hole in the guide part during a movement of the first fastening component in the direction of the guide part, particularly in a direction substantially parallel to the fastening direction, said spacing being sufficient to cause the end of the fastening lug to disengage from said hole. Sloping surfaces of this kind therefore allow a fastening lug to be easily disengaged. These sloping sections may be integral with an inner face of the guide part.

The different retaining means described above may or may not be combined with one another. In particular, a retaining means in the form of a hinge and one or more stop-type or fastening lug-type retaining components may be combined or only a plurality of retaining components or any other combination may be used.

The first fastening component and the second fastening component of the fastening means may be chosen from between a fastening clip and a receiving part, the fastening clip being formed to engage the lock mechanism in the receiving part in the fastening direction. For example, the first fastening component may be a fastening clip. The invention is not, however, limited to this embodiment. In particular, the first and second fastening components may be a plate drilled to receive a rivet, a screw, or similar.

Neither is the invention limited by the number and position of the fastening means; it would therefore be possible to envisage more than two fastening means, distributed, or not, over two or more lateral edges of the air guide and the structural component.

The invention likewise relates to an air guide intended to be assembled on a structural component of a motor vehicle, such as that described earlier.

An air guide of this kind comprises at least two first fastening components disposed on the lateral edges and intended to work together with second fastening components integral with said structural component in a same fastening direction and exhibits the following characteristics:

the first fastening components project laterally from a frame defined by the lateral edges of the structural component in a direction substantially perpendicular to the fastening direction when the air guide is assembled on the structural component, the first fastening component is joined to the air guide by retaining means formed to be broken following an impact in a direction substantially parallel to the fastening direction, the lateral edges of the air guide exhibit guide parts situated substantially opposite second fastening components when the air guide is assembled on the structural component, each guide part being formed to guide a lateral edge of the structural component supporting a second fastening component inside the air guide following a breakage of the first fastening component working together with said second fastening component, this breakage resulting from a movement of the air guide towards the structural component in a direction substantially parallel to the fastening direction.

The guide parts, the retaining means and the first fastening components may be those described previously.

The invention furthermore relates to a motor vehicle comprising an air guide according to the invention.

The invention likewise relates to a motor vehicle equipped with an assembly according to the invention, in which the fastening direction of the air guide is parallel, or substantially parallel, with the longitudinal direction of the vehicle, the air guide being fastened to the front of the structural component. In particular the structural component may form part of the functional front end of the vehicle.

BRIEF DESCRIPTION OF THE DRAWINGS

The invention is now described with reference to the attached, non-limiting drawings, in which:

FIG. 5b is a similar view of the outside of the air guide and FIG. 5c is a detail view of FIG. 5a;

DETAILED DESCRIPTION

In the present description, the terms front, rear, upper, lower, refer to the front and rear directions of the vehicle when the air guide is mounted on the vehicle. The X, Y, Z axes correspond to the longitudinal axis (from front to back), the transverse axis and the vertical axis of the vehicle, respectively.

Substantially horizontal, longitudinal or vertical refers to a direction/a plane forming an angle of no more than ±20°, or else no more than 10°, or no more than 5°, with a horizontal, longitudinal or vertical direction/plane.

Substantially parallel, perpendicular, refers to a direction/an angle of no more than ±20°, or else no more than 10°, or no more than 5°, with a parallel, perpendicular, direction or with a right angle.

Figure 1:
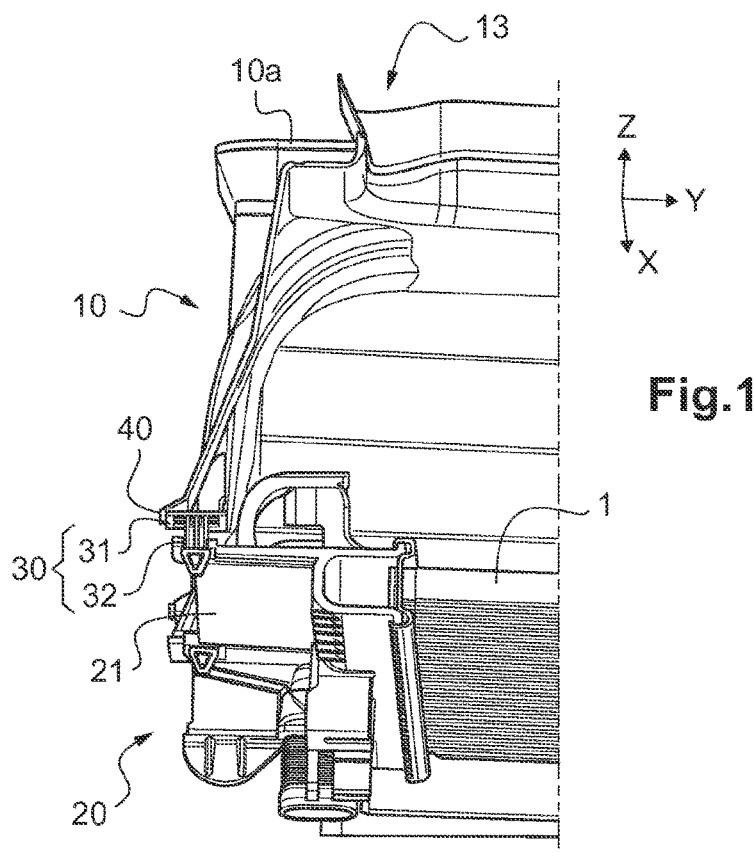
FIG. 1 is a partial perspective view from above showing an assembly according to an embodiment of the invention.
Figure 2:
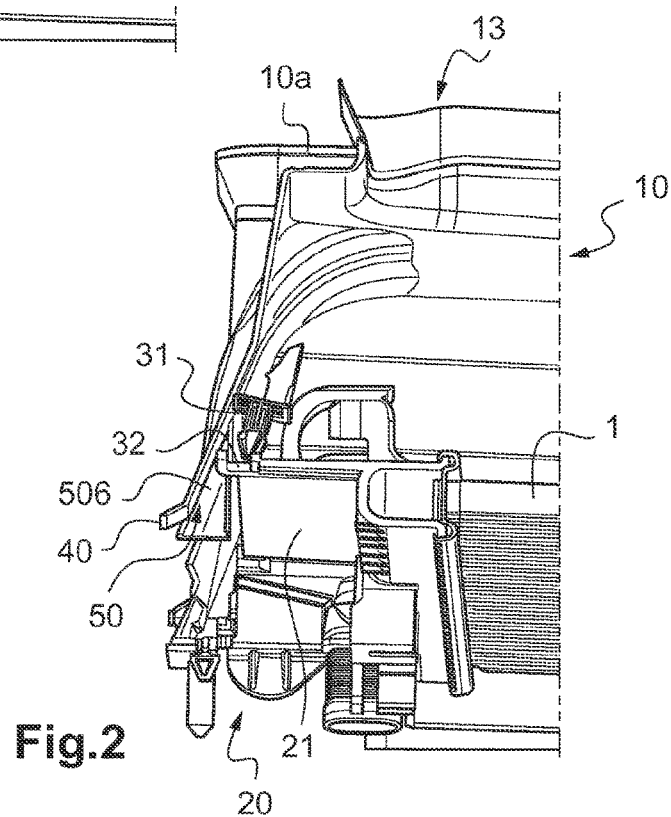
FIG. 2 is a similar view to that in FIG. 1, following a breakage of the fastening means.

FIGS. 1 and 2 partially show assemblies of an air guide 10 on a structural component 20 of a motor vehicle. This structural component 20 exhibits lateral edges 21 defining a frame. In FIGS. 1 and 2, only a vertical lateral edge 21 is depicted, the frame exhibiting a substantially rectangular general shape. The invention is not limited to this particular shape, however. This structural component 20 forms part of the functional front end of the vehicle and supports a radiator 1.

Figure 3:
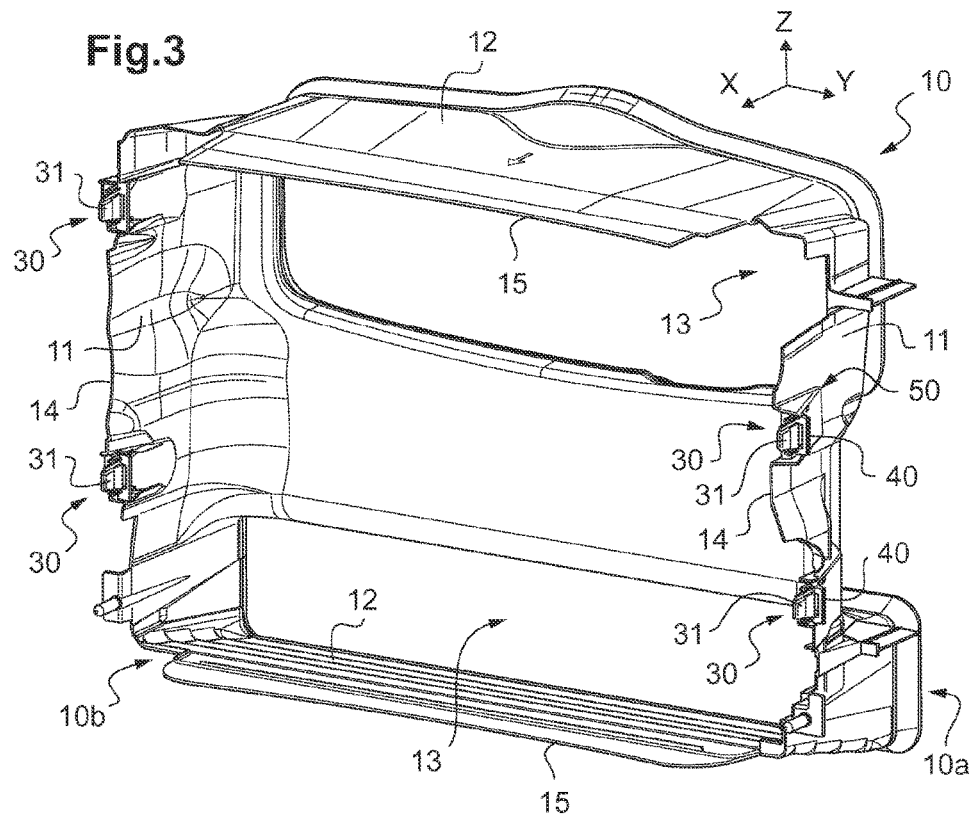
FIG. 3 is a perspective view of the inside of an air guide in the assembly represented in FIGS. 1 and 2.

The air guide 10 shown in full in FIG. 3 exhibits a front face 10a (FIGS. 1 and 2) directed towards the front of the vehicle and a rear face 10b that can be seen in FIG. 3. The air guide 10 is assembled on the structural component 20 of the side of its rear face 10b. The air guide 10 in this case exhibits a substantially rectangular shape defined by lateral walls 11, 12: two substantially vertical lateral walls 11 and two substantially horizontal lateral walls 12. The air guide 10 shown moreover defines two guide channels 13. The invention is not limited by the shape of the air guide and/or the number of guide channels. These guide channels 13 are intended to conduct air from a ventilation opening in the front end of the vehicle (not shown) to the radiator 1 supported by the structural component 20.

On the side of its rear face 10b, the air guide 10 exhibits lateral edges 14, 15 corresponding to the free edges of the lateral walls 11, 12, respectively.

The air guide 10 is assembled on the structural component 20 by a plurality of fastening means 30 disposed on the lateral edges of the air guide and of the structural component. In the example, these fastening means are disposed on the vertical lateral edges 14 and 21. They could, however, be disposed on horizontal lateral edges or on horizontal and vertical lateral edges.

Each fastening means 30 comprises a first fastening component 31 integral with the air guide 10 and a second fastening component 32 integral with the structural component 20 formed to work together in a same fastening direction, in this case the longitudinal direction X of the vehicle. These fastening means 30 moreover project laterally from the frame defined by the lateral edges 21 of the structural component 20 in a direction substantially perpendicular to the fastening direction, in other words, substantially in the YZ plane.

The first fastening component 31 is joined to the air guide 10 by retaining means 40 formed to break following an impact in a direction substantially parallel to the fastening direction. The first fastening component 31 can thereby occupy two positions:

- a usage position (FIG. 1) in which it is linked to the air guide 10 by retaining means 40 and in which it can work together with the second fastening component 32, in order to ensure assembly of the air guide 10 on the structural component 20,
- a free position (FIG. 2) in which it is no longer linked to the air guide following the breakage of the retaining means 40.

The air guide 10 finally exhibits on its lateral edges guide parts 50 situated substantially opposite second fastening components 32, particularly in the fastening direction. In particular, these guide parts 50 are disposed on the lateral edges 14 supporting the first fastening components 31.

Each guide part 50 is formed to guide a lateral edge 21 of the structural component 20 supporting a second fastening component 32 inside the air guide 10 following a breakage of the retaining means 40 linking the first fastening component 31 to the air guide 10, this breakage resulting from a movement of the air guide 10 towards the structural component 20 in a direction substantially parallel to the fastening direction, as shown in FIG. 2.

In the examples shown in the figures, the guide parts define a concavity which is open towards the inside of the air guide and towards the structural component, said concavity exhibiting a splayed shape from the air guide towards the structural component in a direction substantially parallel to the fastening direction. This shape, which is similar to a gulley or funnel, allows the second fastening component 32 to be guided inside a guide part when the retaining means 40 of the first corresponding fastening component 31 break. In particular, the edges of this concavity are not situated opposite the structural component in a direction substantially parallel to the fastening direction, thereby facilitating the introduction of the second guide component inside the guide part and preventing the air guide from being in abutment with the second guide component.

Exemplary embodiments of the guide parts and of the retaining means are described with reference to FIGS. 4 to 7. In the different embodiments described with reference to FIGS. 1 to 7, the same components bear the same reference numbers, possibly with the addition of a prime ('), double prime (") or triple prime ('"), to distinguish different forms of the same components.

Figure 4A:
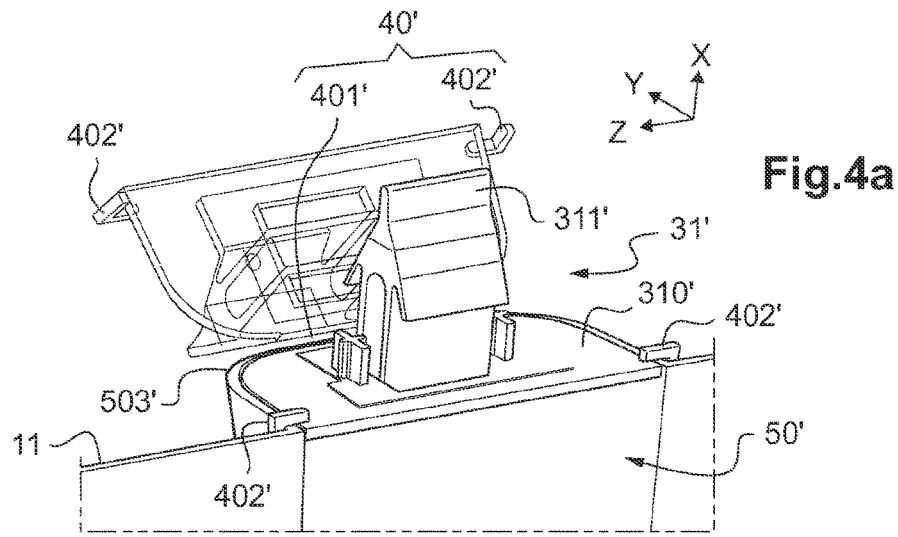
FIGS. 4a and 4b represent a view of the inside of an air guide exhibiting part of a fastening means of an assembly according to a first embodiment.
Figure 4B:
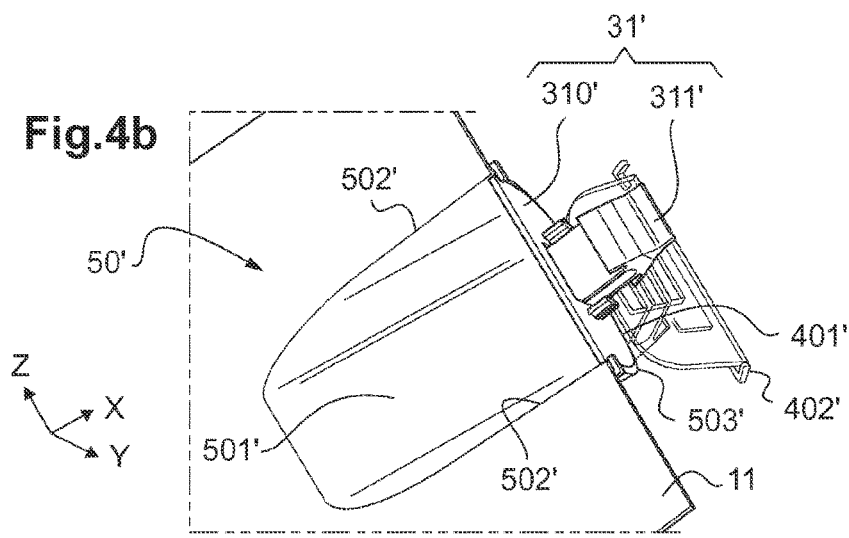

FIG. 4*a* thus exhibits a guide part 50' in the form of a splayed concavity. This guide part 50' exhibits a sloping section 501' splaying out in the direction of the structural component in a direction substantially parallel to the fastening direction (FIG. 4*b*). This sloping section 501' substantially extends in the extension of the lateral wall 11 of the air guide. The remainder of the concavity is defined by two other lateral surfaces 502' substantially perpendicular in respect of the lateral wall 11. These different surfaces 501' and 502' are substantially planar and linked by rounded forms.

In this embodiment, maintenance means 40' link the first fastening component 31' to the guide part 50', these retaining means 40' allowing a swinging of the first fastening component 31' in respect of a free edge 503' of the guide part 50', as can be seen in FIGS. 4*a* and 4*b*, this free edge 503' being directed towards the structural component 20. These FIGS. 4*a*, 4*b* show the first fastening component 31' in the usage position and in a third position in which it is linked to the guide part but in a position other than the usage position.

The first fastening component 31' in this case exhibits a support plate 310' supporting a fastening clip 311'.

The retaining means 40' in this case link the support plate 310' to the guide part 50'.

Figure 4C:
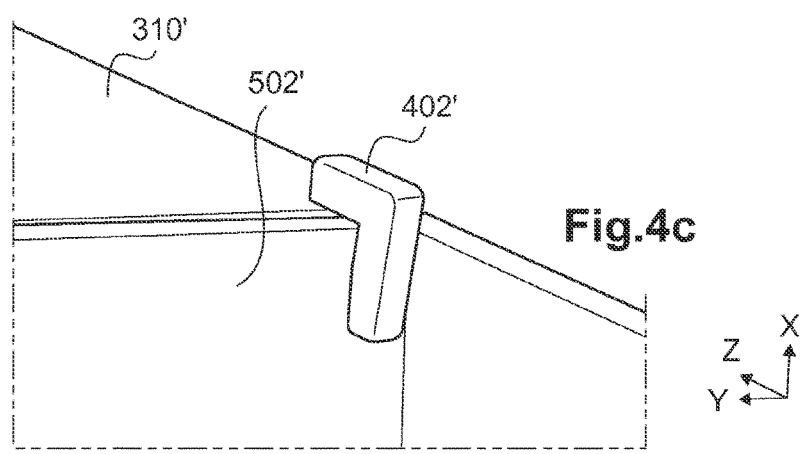
FIG. 4c is a detail view of a retaining component.

The retaining means 40' in this case comprise a hinge 401' and two retaining components 402', the hinge 401' extends between the support plate 310' and the free edge 503' level with the sloping section 501', the retaining components 402' each link the support plate 310' and the free edge 503' level with a lateral section 502' in the usage position (see FIG. 4*c*). In this example, the hinge 401' may be a film hinge and each retaining component 402' is a fastening lug, in this case substantially in the form of a set square, one part of which is integral with the support plate 310' and the other part is integral with the outer face of the lateral section 502' of the guide part 50' in the usage position of the first fastening component 31'. These retaining components 402' and the hinge 401' are fusible, something that can be obtained by a thinning of the material, by making slots, notches, divisible forms, . . . .

The first fastening component 31' may therefore be cast with the air guide in a casting position situated at 90°, for example, from the usage position, after which it is lowered into its usage position, in which it substantially closes the guide part 50' in the direction of the structural component 20. The retaining components 402' can then be joined to the air guide.

In a variant which is not shown, the first fastening component 31' could be retained on the air guide simply by retaining components 402': in this case it is produced separately from the air guide then joined to the latter.

It is evident that in this embodiment, the first fastening component 31' closes the open end of the guide part 50' directed towards the structural component, in other words in the fastening direction of the fastening means. In particular, the first fastening component 31' closes the open end of the guide part 50' along the free edges thereof.

Figure 5A:
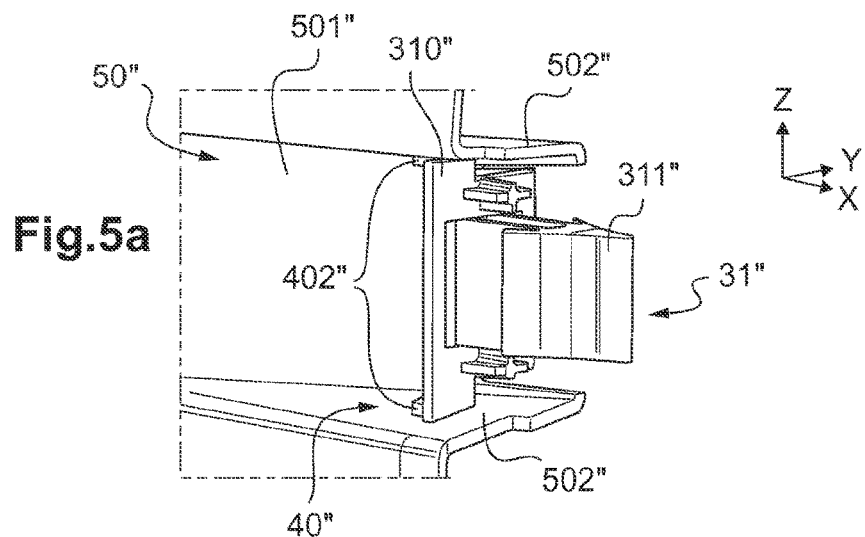
FIG. 5a depicts a view of the inside of an air guide showing part of a fastening means of an assembly according to a second embodiment.
Figure 5B:
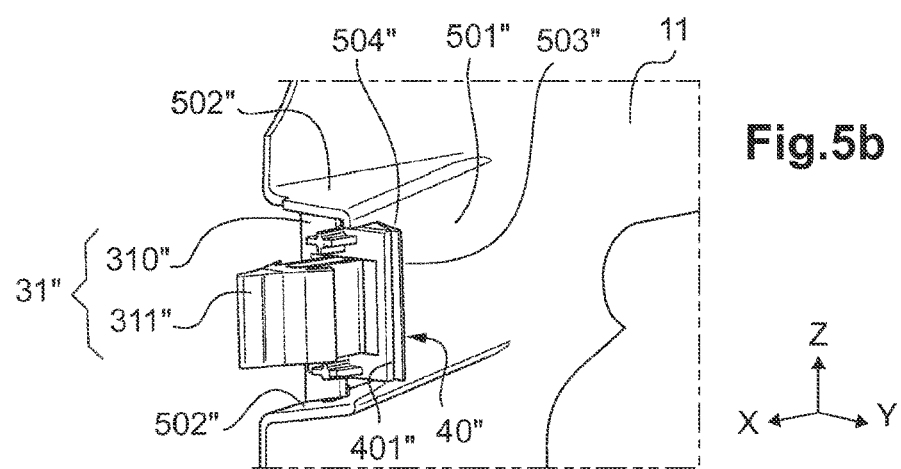
Figure 5C:
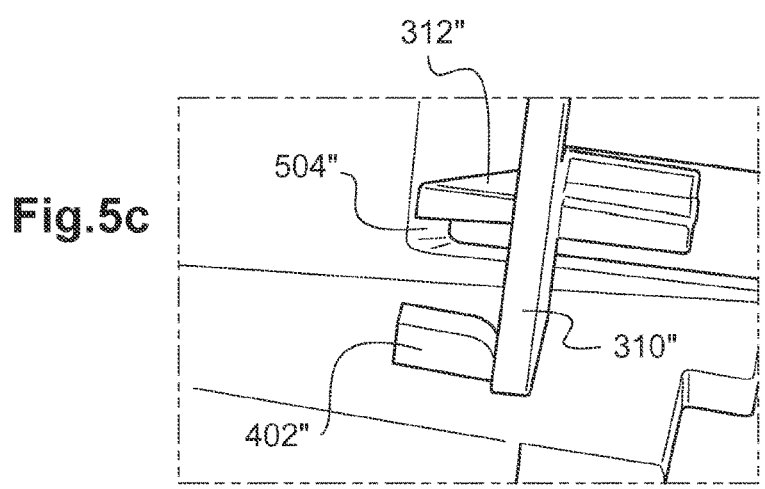

FIGS. 5*a* to 5*c* show another embodiment that differs from the preceding one in the shape of the guide part 50" and in the retaining means 40". As in the preceding example, the first fastening component 31" in this case exhibits a support plate 310" supporting a fastening clip 311" and the retaining means 40" link the support plate 310" to the guide part 50", but on the inside thereof.

This embodiment likewise differs from the preceding one in the fact that:

- the lateral sections 502" which are substantially perpendicular to the lateral wall 11 are linked to the central sloping section 501" splayed towards the structural component in a direction substantially parallel to the fastening direction by corners and not rounded forms (FIGS. 5*a*, 5*b*),
- the retaining means 40" comprise two retaining components 402" in the form of stops disposed on the lateral sections 502", on the inner face of the guide part 50", distal from the free edge of the lateral sections 502",
- retaining means 40" comprise a hinge 401" extending between the support plate 310" and the free edge 503" of the guide part 50" level with the sloping section 501", said free edge 503" being situated on an end portion 504" of the sloping section 501" more sloping towards the outside of the air guide.

The support plate 310" thereby extends slightly below the free edges of the lateral sections 502" in such a manner that when the retaining means 40" break, already being partially inside the guide part 50", the second fastening component working together with the first fastening component 31" cannot accidentally emerge from the guide part 50".

Each stop 402" exhibits an end surface in contact with the support plate 310", rounded in shape, which can enable them to pass through the support plate 310" following a rotation thereof in the direction of the sloping section 501", then a breakage of the hinge 401". This breakage of the hinge 401" may be facilitated by the presence of triangular supports 312" or cams which are integral with the face of the support plate 310" directed towards the inside of the guide part and supported on the more sloping end 504" of the section 501" (FIG. 5c).

The stops 402" may be mounted stops or they may be formed by a boss on the wall of the guide part.

Figure 6A:
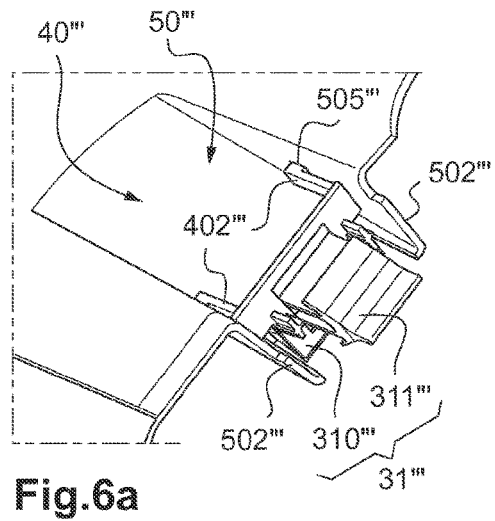
FIG. 6a depicts a view of the inside of an air guide showing part of a fastening means of an assembly according to a third embodiment.
Figure 6B:
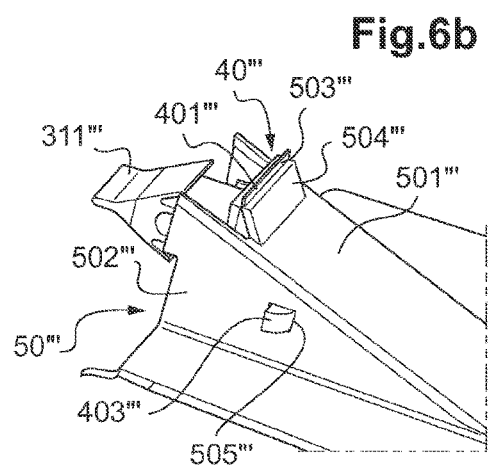
FIG. 6b is a similar view of the outside of the air guide.

The embodiment represented in FIGS. 6a, 6b, differs from the preceding embodiment substantially due to the shape of the retaining components 402'''. In this case, the first fastening component 31''' exhibits a support plate 310''' supporting a fastening clip 311''' and retaining means 40''' link the support plate 310''' to the guide part 50''', likewise partially on the inside thereof. To this end, a hinge 401''' extends between the support plate 310''' and the free edge 503''' of the guide part 50''' level with the sloping section 501''', this free edge 503''' being situated on an end portion 504''' of the sloping section 501''' more sloping towards the outside of the air guide.

The retaining means 40''' comprise two retaining components 402''' in the form of fastening lugs, one end of which is integral with the face of the support plate 310''' directed towards the inside of the guide part 50''', and the other end 403''' whereof crosses a hole 505''' provided to this end in each lateral section 502''' of the guide part. The rounded shape of this end 403''' will be noted, which can enable the fastening tabs 402''' to leave the holes 505''' following a pivoting of the first fastening component 31''' towards the inside of the guide part.

Figure 7A:
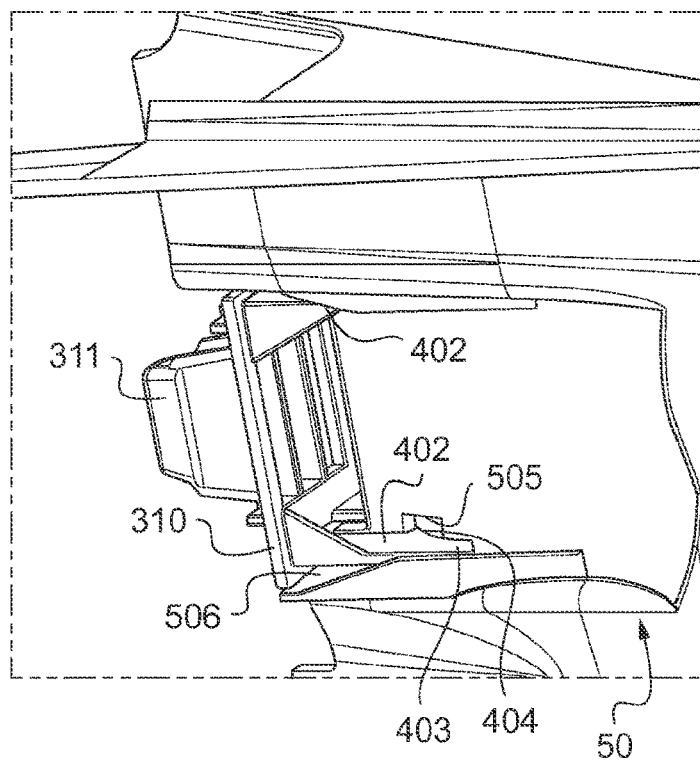
FIG. 7a depicts a view of the inside of an air guide showing part of a fastening means of an assembly according to a fourth embodiment corresponding to the embodiment in FIGS. 1 to 3.
Figure 7B:
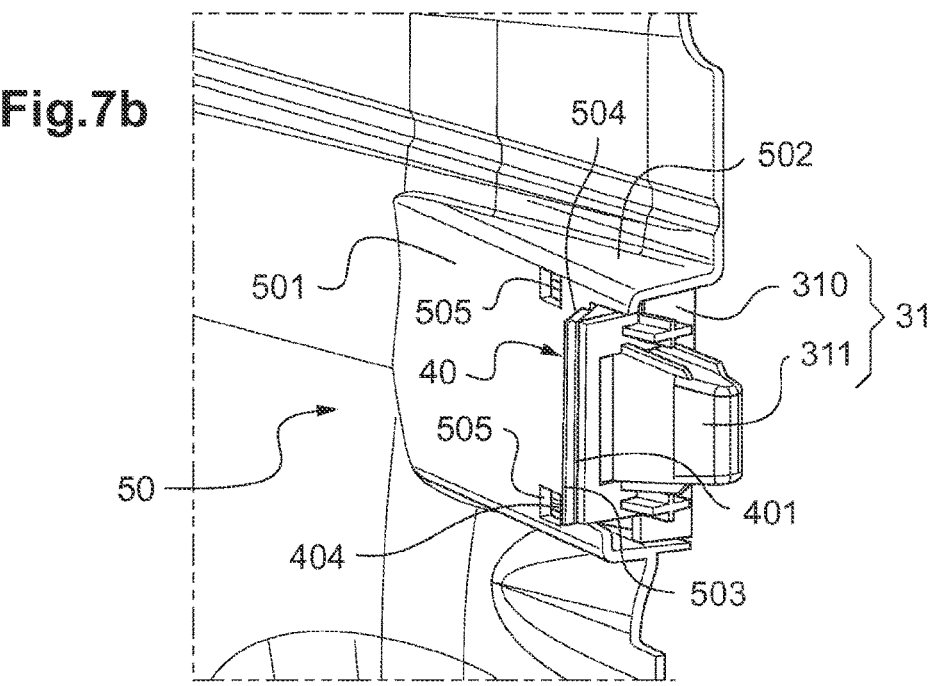
FIG. 7b is a similar view of the outside of the air guide.

The embodiment represented in FIGS. 7a and 7b is similar to the preceding one, the essential difference being the position of the receiving holes of the retaining lugs. This embodiment of the guide part 50 and retaining means 40 corresponds to that shown in FIGS. 1 to 3. In this case, the first fastening component 31 exhibits a support plate 310 supporting a fastening clip 311 and retaining means 40 link the support plate 310 to the guide part 50, likewise partially on the inside thereof. To this end, a hinge 401 extends between the support plate 310 and the free edge 503 of the guide part 50 level with the central sloping section 501, this free edge 503 being situated on an end portion 504 of the sloping section 501 sloping more towards the outside of the air guide.

The retaining means 40 comprise two retaining components 402 in the form of fastening lugs, one end of which is integral with the face of the support plate 310 directed towards the inside of the guide part 50, and the other end 403 of which penetrates a hole 505 provided to this end on the central sloping section 501 of the guide part. In the example shown, a projecting part 404 penetrates the hole 505, as can be seen in FIG. 7a. This projecting part 404 is triangular in shape, the angle of the projecting point being obtuse, which may enable the fastening lug to exit from the hole 505.

In this embodiment, the release of the fastening lugs 402 from the holes 505 is, moreover, made easier by sloping surfaces 506 positioned on the internal faces of the lateral surfaces 502. These sloping sections 506, one of which can also be seen in FIG. 2, are formed to move away the fastening lugs 402 of the adjacent lateral surface 402 during the pivoting of the first fastening component 31 towards the inside of the guide part. Their slope is thereby determined, so that the divergence is sufficient to cause the end of the fastening lug 402 to be released from the hole 505. In other words, during this pivoting movement, the fastening lugs 402 draw close to one another and are thereby disengaged from the holes 505.

In the embodiments described with reference to FIGS. 6a, b, c and 7a, b, the first fastening component 31''', 31 may likewise comprise triangular supports or cams integral with the face of the support plate 310''', 310 directed towards the inside of the guide part and resting on the more sloping end 504''', 504 of the section 501''', 501, in order to facilitate the breakage of the hinge 401''', 401 as described in the embodiment in FIGS. 5a, b, c

In the embodiments described with reference to the figures, the first retaining component is a fastening clip, but it could likewise be a receiving part of a fastening clip, for example a drilled plate formed to work together with a fastening clip, said plate being capable of being fastened and retained in the same manner as the support plate described with reference to the figures. Alternatively, a drilled or full plate could be envisaged for a rivet or screw assembly.

The invention claimed is:

1. An assembly comprising:
   an air guide on a structural component of a motor vehicle; and
   at least two fastening means of the air guide to the structural component, said fastening means being disposed on lateral edges of said air guide and of the structural component, each fastening means comprising a first fastening component integral with the air guide and a second fastening component integral with the structural component, the first and second fastening components being formed to work together in a same fastening direction,
   wherein the fastening means project laterally from a frame defined by the lateral edges of the structural component in a direction substantially perpendicular to the fastening direction,
   wherein the first fastening component is joined to the air guide by retaining means formed to break following an impact in a direction substantially parallel to the fastening direction, and
   wherein the lateral edges of the air guide exhibit guide parts situated substantially opposite second fastening components, each guide part being formed to guide a lateral edge of the structural component supporting a second fastening component inside the air guide following a breakage of the retaining means of the first fastening component working together with said second fastening component, the breakage resulting in a movement of the air guide towards the structural component in a direction substantially parallel to the fastening direction.

2. The assembly as claimed in claim 1, wherein a free edge of a guide part directed towards the structural component is not opposite the structural component in the fastening direction.

3. The assembly as claimed in claim 1, wherein a guide part defines a concavity open towards the inside of the air guide and towards the structural component, said concavity exhibiting a splayed shape from the air guide towards the structural component in a direction substantially parallel to the fastening direction.

4. The assembly as claimed in claim 3, wherein the guide part exhibits at least one sloping section splayed towards the structural component in a direction.

5. The assembly as claimed in claim 1, wherein the retaining means link a first fastening component to a guide part.

6. The assembly as claimed in claim 1, wherein the retaining means comprise a hinge liming the first fastening component to a free edge of said guide part.

7. The assembly as claimed in claim 1, wherein the retaining means comprise at least one retaining component formed to hold the first fastening component, the retaining component being chosen from among:
   a stop formed by a boss on the guide part,
   a mounted stop fastened to the guide part,
   a fastening lug integral with the guide part and the first fastening component, and
   a fastening lug integral with the first fastening component, one end of which is inserted in, or is in contact with, a hole in the guide part.

8. The assembly as claimed in claim 7, wherein the retaining component is the fastening lug integral with the first fastening component, one end of which inserted in, or in contact with, a hole in the guide part, and wherein the guide part comprises sloping surfaces formed to move said fastening lug away from the hole in the guide part during a movement of the first fastening component in the direction of the guide part, this spacing being sufficient to cause the end of the fastening lug to disengage from said hole.

9. An air guide for an assembly with a structural component as claimed in claim 1, the air guide comprising at least two first fastening components disposed on the lateral edges and intended to work together with second fastening components integral with said structural component in a same fastening direction,
   wherein the first fastening components project laterally from a frame defined by the lateral edges of the structural component in a direction substantially perpendicular to the fastening direction when the air guide is assembled on the structural component,
   wherein the first fastening component is joined to the air guide by retaining means formed to be broken following an impact in a direction substantially parallel to the fastening direction, and
   wherein the lateral edges of the air guide exhibit guide parts situated substantially opposite second fastening components when the air guide is assembled on the structural component, each guide part being formed to guide a lateral edge of the structural component supporting a second fastening component inside the air guide following a breakage of the first fastening component working together with said second fastening component, the breakage resulting from a movement of the air guide towards the structural component in a direction substantially parallel to the fastening direction.

10. A motor vehicle comprising:
   an assembly as claimed in claim 1, wherein the fastening direction of the air guide is parallel or substantially parallel to the longitudinal direction of the vehicle, the air guide being fastened to the front of the structural component.

* * * * *